(12) United States Patent
Jang et al.

(10) Patent No.: US 8,058,813 B2
(45) Date of Patent: Nov. 15, 2011

(54) BACKLIGHT UNIT AND LIQUID CRYSTAL DISPLAY DEVICE INCLUDING THE SAME

(75) Inventors: Jin-Won Jang, Asan-si (KR);
Jheen-Hyeok Park, Seongnam-si (KR);
Moon-Shik Kang, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 517 days.

(21) Appl. No.: 12/207,639

(22) Filed: Sep. 10, 2008

(65) Prior Publication Data
US 2009/0121643 A1 May 14, 2009

(30) Foreign Application Priority Data

Nov. 13, 2007 (KR) .................. 10-2007-0115263

(51) Int. Cl.
*H05B 37/00* (2006.01)
(52) U.S. Cl. ........ 315/239; 315/250; 315/276; 315/291; 315/308; 345/102
(58) Field of Classification Search .............. 315/209 R, 315/210, 219, 224, 225, 226, 250, 255, 276, 315/277, 283, 291, 307, 308; 345/102
See application file for complete search history.

(56) References Cited

U.S. PATENT DOCUMENTS

| 6,737,816 | B2 * | 5/2004 | Nakatsuka et al. | 315/291 |
| 7,288,903 | B2 * | 10/2007 | Jang et al. | 315/307 |
| 7,830,099 | B2 * | 11/2010 | Ger et al. | 315/291 |
| 2002/0181260 | A1 * | 12/2002 | Chou et al. | 363/95 |
| 2006/0197466 | A1 * | 9/2006 | Park | 315/224 |
| 2007/0093165 | A1 * | 4/2007 | Komatsu et al. | 445/23 |
| 2007/0152609 | A1 * | 7/2007 | Po | 315/291 |
| 2008/0196945 | A1 * | 8/2008 | Konstas | 178/18.03 |
| 2009/0091267 | A1 * | 4/2009 | Lee et al. | 315/228 |

FOREIGN PATENT DOCUMENTS

CN 2909771 6/2007

OTHER PUBLICATIONS

English Abstract for Publication No. CN 2909771.

* cited by examiner

*Primary Examiner* — Douglas W Owens
*Assistant Examiner* — Thai Pham
(74) *Attorney, Agent, or Firm* — F. Chau & Associates, LLC

(57) ABSTRACT

A backlight unit of a liquid crystal display includes a lamp, a balancing pattern capacitor electrically connected to the lamp for current balance, a transformer electrically connected to the lamp via the balancing pattern capacitor, a sensing pattern capacitor electrically connected to a terminal of the balancing pattern capacitor connected to the lamp to detect an abnormal driving state of the lamp, and a feedback circuit unit electrically connected to the sensing pattern capacitor to control the abnormal driving state of the lamp. A liquid crystal display device including the backlight unit is also disclosed.

20 Claims, 5 Drawing Sheets

BACKLIGHT UNIT AND LIQUID CRYSTAL DISPLAY DEVICE INCLUDING THE SAME

CROSS-REFERENCE TO RELATED APPLICATION

This application claims priority, under 35 USC §119, to Korean Patent Application No. 10-2007-115263 filed on Nov. 13, 2007, which is incorporated herein by reference in its entirety.

BACKGROUND OF THE INVENTION

1. Technical Field

The present disclosure relates to a liquid crystal display ("LCD") device and more particularly to a backlight unit included in an LCD device.

2. Discussion of the Related Art

An LCD device is light weight display device that consumes less power than a display device that is based on a cathode ray tube ("CRT"). The LCD display device may be designed to have a large screen for effective viewing of high-definition video content. Such large screen display devices may have a display that is 30" or larger. Other recent technologies for producing large screen displays include plasma display panels ("PDP").

A cold cathode fluorescent lamp ("CCFL") has conventionally been utilized as a light source for an LCD device. Multiple CCFL circuits are used in a direct type backlight unit for large screen LCD display devices.

In LCD displays, a single AC transformer may not be able to effectively power multiple CCFL circuits owing to the fact that the first-driven CCFL circuit may have a lower impedance than subsequently driven CCFL circuits and this impedance imbalance may make it difficult to balance current between the various CCFL circuits. Accordingly, one or more of the CCFL circuits may not be effectively driven.

Various techniques have been studies to effectively power multiple CCFL circuits using a single AC transformer. For example, a capacitor balancing approach has been developed.

FIG. 1 is a circuit diagram showing a backlight unit using the capacitor balancing method according to the related art. Referring to FIG. 1, a lamp 111 is driven by a transformer 115 via a capacitor 113. The capacitor 113 is electrically connected to the lamp 111 and has an impedance equal to or more than the lamp 111. Even though the plurality of the lamps 111 is driven by a transformer 115, the impedance of the capacitor 113 remains constant, thereby maintaining the current balance.

However, the capacitor used in the capacitor balancing method needs to have a high impedance and thus has difficulty stopping the driving of the lamps in an abnormal driving state.

SUMMARY OF THE INVENTION

An aspect of the present invention provides a backlight unit that has a protection circuit to stop driving a lamp in an abnormal driving state. A pattern capacitor balancing method is used. The process cost is reduced.

Additional features of the exemplary embodiments of the present invention will be set forth in the detailed description of exemplary embodiments that follows.

An exemplary embodiment of the present invention provides a backlight unit including a lamp, a balancing capacitor electrically connected to the lamp for current balance, a transformer electrically connected to the lamp via the balancing pattern capacitor, a sensing pattern capacitor electrically connected to a terminal of the balancing capacitor to detect a voltage across the balancing capacitor, and a feedback circuit that is electrically connected to the sensing capacitor to detect an abnormal driving state of the lamp. The terminal of the balancing capacitor is electrically connected to the lamp.

The balancing capacitor may include a first printed circuit board ("PCB") substrate, a first conductive layer, and a second conductive layer. The first conductive layer is electrically connected to a first face of the first PCB substrate and the transformer, and the second conductive layer is electrically connected to a second face of the first PCB substrate and the lamp. The second face opposites to the first face of the first PCB substrate.

The sensing capacitor may include the second conductive layer, a second PCB substrate that is electrically connected to the second conductive layer at a first face of the second PCB substrate, and a third conductive layer that is formed on a second face of the second PCB substrate opposing to the first face of the second PCB substrate, and is electrically connected to the second PCB substrate.

The second PCB substrate is electrically connected to the feedback circuit.

The lamp may be a cold cathode fluorescence lamp ("CCFL").

A first electrode terminal of the lamp may be connected to a circuit that includes the balancing capacitor, the transformer, the sensing capacitor, and the feedback circuit, and a second electrode terminal of the lamp may be electrically grounded.

Each of the two electrode terminals of the lamp is connected to a circuit that includes the balancing capacitor, the transformer, the sensing capacitor, and the feedback circuit.

The feedback circuit may detect the abnormal driving state of the lamp by using a voltage applied from the balancing capacitor to the sensing capacitor.

The first, second, and third conductive layers may be made of a metal foil, respectively.

An exemplary embodiment of the present invention provides a liquid crystal display device including a liquid crystal display panel to display images and a backlight unit to supply light to the liquid crystal display panel. The backlight unit may include a lamp, a balancing capacitor that is electrically connected to the lamp for current balance, a transformer that is electrically connected to the lamp via the balancing capacitor, a sensing capacitor that is electrically connected to a terminal of the balancing pattern capacitor to detect a voltage across the balancing capacitor, and a feedback circuit that is electrically connected to the sensing capacitor to detect an abnormal driving state of the lamp. The terminal of the balancing capacitor is electrically connected to the lamp.

The balancing capacitor may include a first PCB substrate, a first conductive layer, and a second conductive layer. The first conductive layer is electrically connected to a first face of the first PCB substrate and the transformer. The second conductive layer is electrically connected to a second face of the first PCB substrate and the lamp. The second face of the first PCB substrate opposites to the first face of the first PCB substrate.

The sensing capacitor may include the second conductive layer, a second PCB substrate electrically connected to the second conductive layer at a first face of the second PCB substrate and a third conductive layer formed on a second face of the second PCB substrate opposing to the first face of the second PCB substrate and electrically connected to the second PCB substrate.

The second PCB substrate is electrically connected to the feedback circuit.

The lamp may be a CCFL.

A first electrode terminal of the lamp may be connected to a circuit that includes the balancing capacitor, the transformer, the sensing capacitor, and the feedback circuit. A second electrode terminal of the lamp may be electrically grounded.

Each of the two electrode terminals of the lamp may be electrically connected to the circuit. The circuit includes the balancing capacitor, the transformer, the sensing capacitor, and the feedback circuit.

The feedback circuit may detect the abnormal driving state of the lamp by using voltages applied from the balancing capacitor to sensing capacitor.

The first, second, and third conductive layers may be made of a metal foil, respectively.

BRIEF DESCRIPTION OF THE DRAWINGS

The accompanying drawings are included to provide a further understanding of the disclosure and are incorporated in and constitute a part of this specification. The accompanying drawings illustrate exemplary embodiments of the disclosure, and together with the description, serve to explain the principles of the disclosure. In the accompanying drawings.

DETAILED DESCRIPTION OF EXEMPLARY EMBODIMENTS

Figure 1:
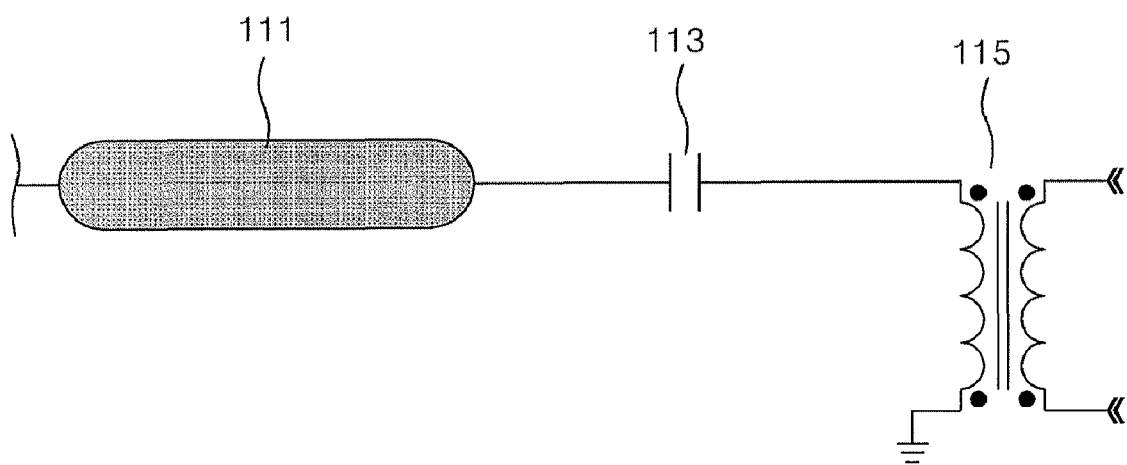
FIG. 1 is a circuit diagram illustrating a backlight unit using the capacitor balancing method according to the related art.
Figure 2:
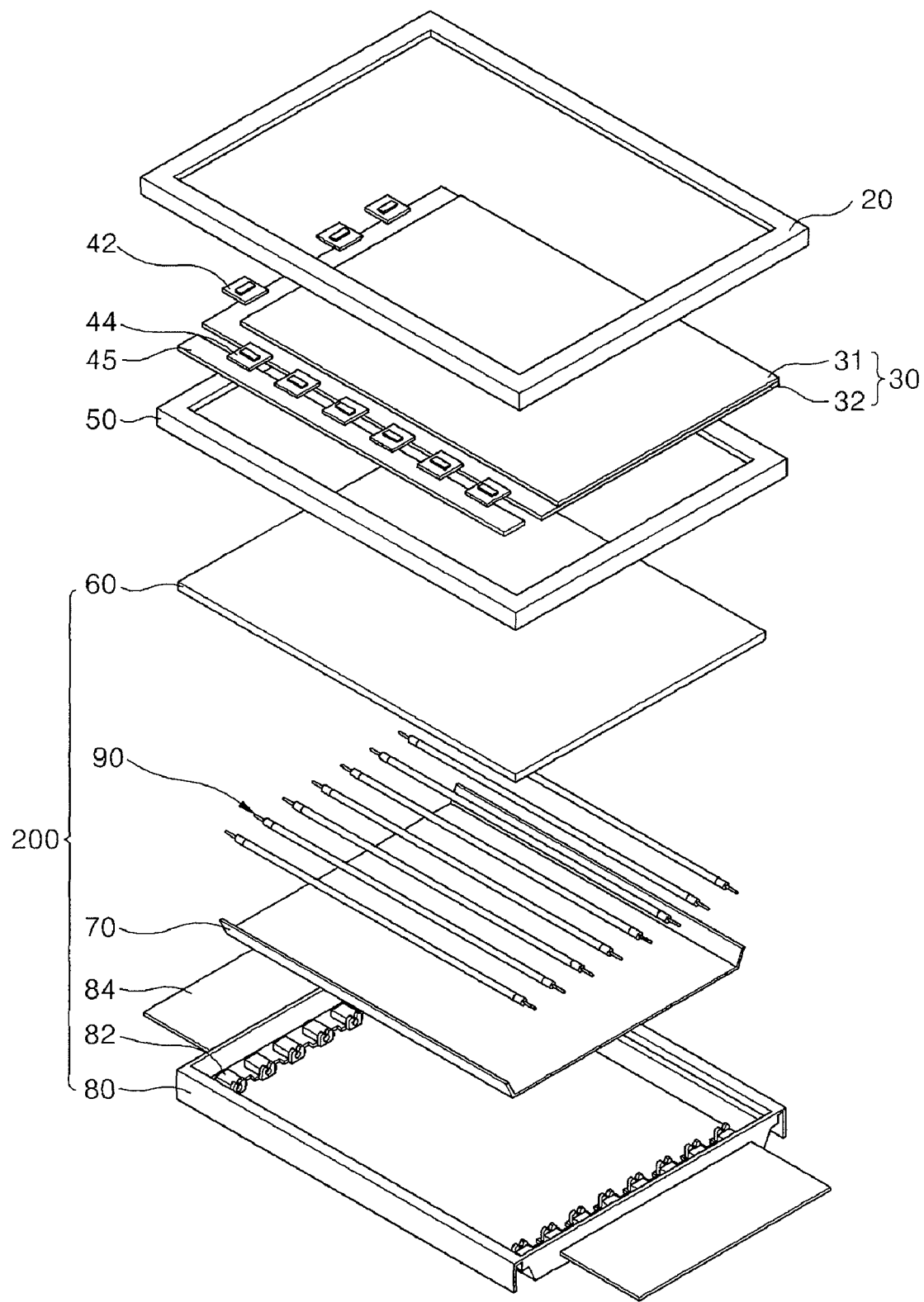
FIG. 2 is an exploded perspective view of an LCD device according to an exemplary embodiment of the present invention.

FIG. 2 is an exploded perspective view of a liquid crystal display ("LCD") device according to an exemplary embodiment of the present invention.

Referring to FIG. 2, an LCD device in accordance with an exemplary embodiment of the present invention includes an LCD panel 30 and a backlight unit 200 supplying light to the LCD panel 30.

The LCD panel 30 includes a color filter substrate 31 having color filters and a thin film transistor ("TFT") substrate 32 having TFTs. The color filter substrate 31 is attached to the TFT substrate 32, with liquid crystals disposed between the two substrates.

The LCD panel 30 includes sub-pixels independently driven by the TFTs and arranged in a matrix shape. Each of the sub-pixels controls a liquid crystal arrangement according to a voltage difference between a common voltage supplied from a common electrode and a pixel voltage supplied from a pixel electrode. The liquid crystal arrangement controls light transmittance through each sub-pixel, thereby allowing the LCD panel 30 to display images. Because the LCD panel 30 does not emit light, the LCD panel 30 uses light emitted from the backlight unit 200.

The TFT substrate 32 of the LCD panel 30 is electrically connected to a panel driver. The panel driver includes a gate driver, a data driver, a gate circuit film 42, a data circuit film 44, and a printed circuit board ("PCB") substrate 45. The gate circuit film 42 includes the data driver thereon, the data circuit film 44 includes the gate driver thereon, and the PCB substrate 45 includes driving elements, such as a timing controller (not shown), thereon.

The gate driver drives gate lines formed on the TFT substrate 32 and the data driver drives data lines formed on the TFT substrate 32.

One side of the gate circuit film 42 is electrically connected to the TFT substrate 32. One side of the data circuit film 44 is electrically connected to the TFT substrate 32 and the remaining side of the data circuit film 44 is electrically connected to the PCB substrate 45.

The gate and data circuit films 42 and 44 may represent a chip on film ("COF") or a tape carrier package ("TCP"). The gate and data drivers may be mounted on the TFT substrate 32 by a chip on glass ("COG") method or may be formed on the TFT substrate 32.

The backlight unit 200 includes a plurality of lamps 90, a lamp driver 84, optical sheets 60, and reflective sheets 70.

The plurality of the lamps 90 are arranged in a bottom chassis 80 with a predetermined space between each lamp. The lamps 90 are inserted in lamp sockets 82 formed at both end sides of the bottom chassis 80.

The number of the lamp sockets 82 is substantially equal to the number of the lamps 90. Each of the lamps 90 includes electrodes at both end sides so that the electrodes are electrically connected to the lamp driver 84 through the lamp sockets 82.

A top chassis 20 is formed to surround an edge portion of the LCD panel 30. For example, the top chassis 20 may be formed to surround a non-display region of a top surface of the LCD panel 30. The top chassis 20 is coupled to the bottom chassis 80 to fix the LCD panel 30.

The optical sheets 60 include a diffusion sheet, a prism sheet, and a protection sheet that are sequentially stacked on the lamps 90. The diffusion sheet diffuses light emitted from the lamps 90 to provide uniform light. The prism sheet has an upper surface in which a triangular prism is repeatedly formed to condense light diffused by the diffusion sheet in a direction perpendicular to a plane of the LCD panel 30. Most of the light passing through the prism sheet propagates in a direction perpendicular to the plane of the LCD panel 30 to have uniform brightness distribution. The protective sheet protects the prism sheet.

A mold frame 50 receives the optical sheets 60 and the LCD panel 30 seats on an upper surface of the mold frame 50.

The lamp driver 84 includes balancing capacitors, transformers, sensing capacitors, and feedback circuit units. Each of the balancing capacitors is electrically connected to each of the lamps 90, and the transformers are electrically connected to the lamps 90 through the balancing capacitors to provide power to the lamps 90. The sensing capacitors are electrically connected to the balancing capacitors to detect an abnormal driving state of the lamps 90. The feedback circuit units are electrically connected to the sensing capacitors to control the abnormal driving state of the lamps 90.

Figure 3:
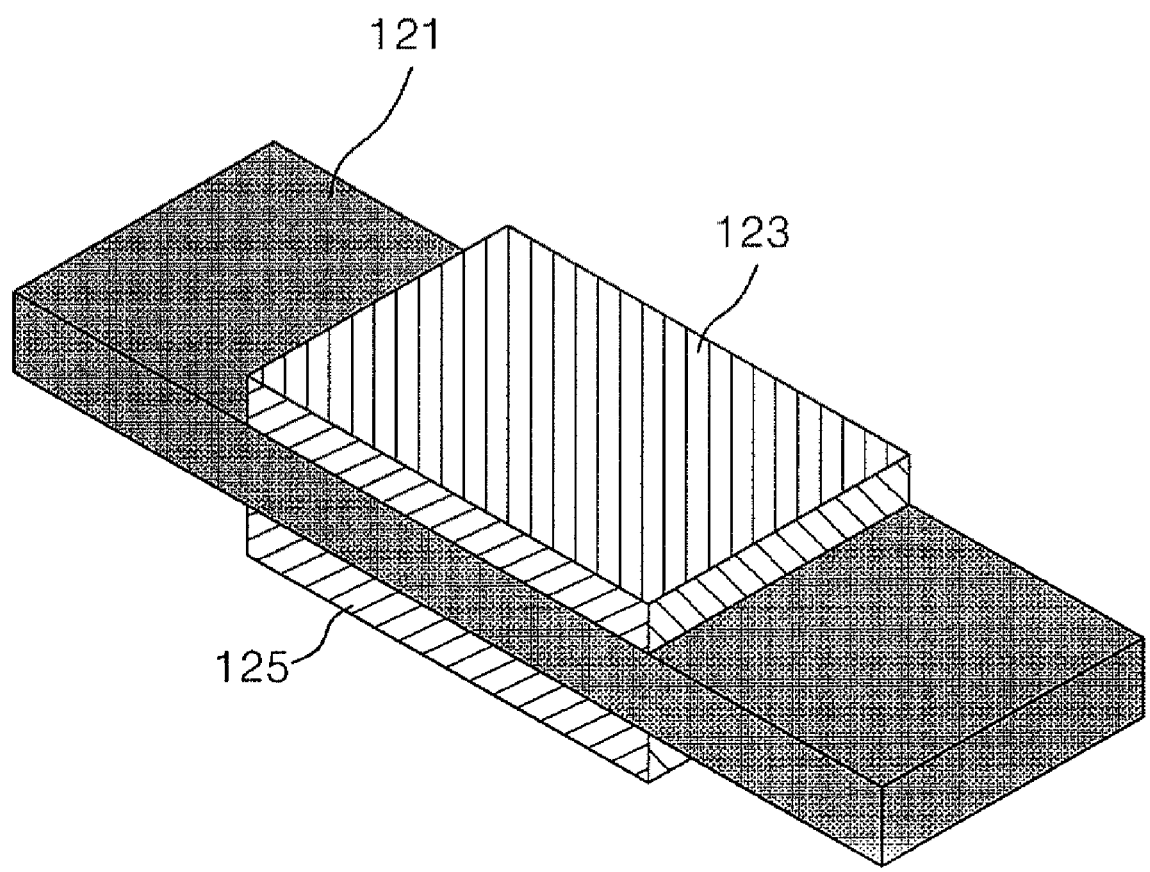
FIG. 3 is a perspective view of a backlight unit using a pattern capacitor.

FIG. 3 is a perspective view of a backlight unit using a pattern capacitor according to an exemplary embodiment of the present invention.

The balancing pattern capacitor and the sensing pattern capacitor are organized by using the pattern capacitor. The pattern capacitor includes a PCB substrate 121, a first conductive pattern layer 123, and a second conductive pattern layer 125. The first and second conductive pattern layers 123 and 125 are formed on both surfaces of the PCB substrate 121, and are made of metal foils. When the areas of the conductive pattern layers 123 and 125 becomes larger or when the thickness of the PCB substrate 121 becomes thinner, a capacitance of the pattern capacitor becomes larger. However, since the thickness of the PCB substrate 121 is standardized, the capacitance of the pattern capacitor is determined by the areas of the conductive pattern layers 123 and 125.

A ceramic capacitor of a conventional capacitor element is large and expensive. The ceramic capacitor has difficulty stopping the driving of the lamps in an abnormal driving state when a high voltage is applied to the ceramic capacitor. The above problem can be solved by organizing the balancing pattern capacitor and the sensing pattern capacitor.

Figure 4:
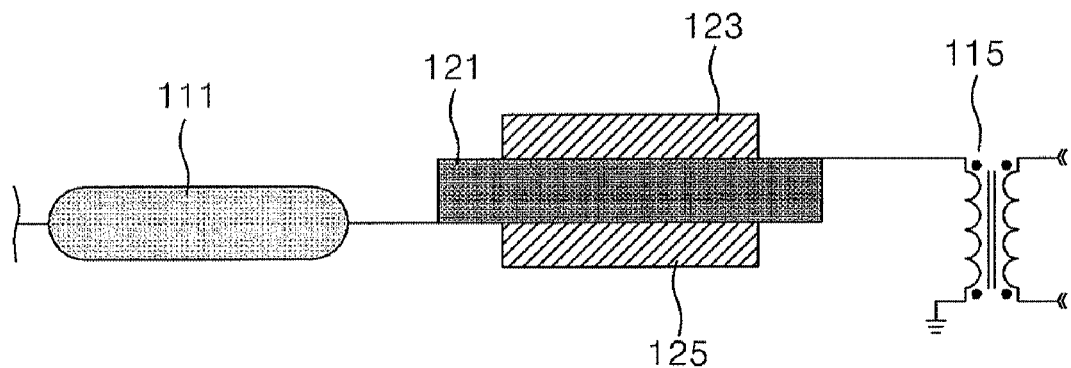
FIG. 4 is a circuit diagram of a backlight unit according to an exemplary embodiment of the present invention.

FIG. 4 is a circuit diagram of a backlight unit according to an exemplary embodiment of the present invention. As shown in FIG. 4, the balancing capacitor includes the PCB substrate 121, the first conductive pattern layer 123 and the second conductive pattern layer 125. The first and second conductive pattern layers 123 and 125 surrounds the PCB substrate 121 and are electrically connected to the PCB substrate 121. The first and second conductive pattern layers 123 and 125 are electrically connected to a transformer 115 and a lamp 111, respectively.

Figure 5:
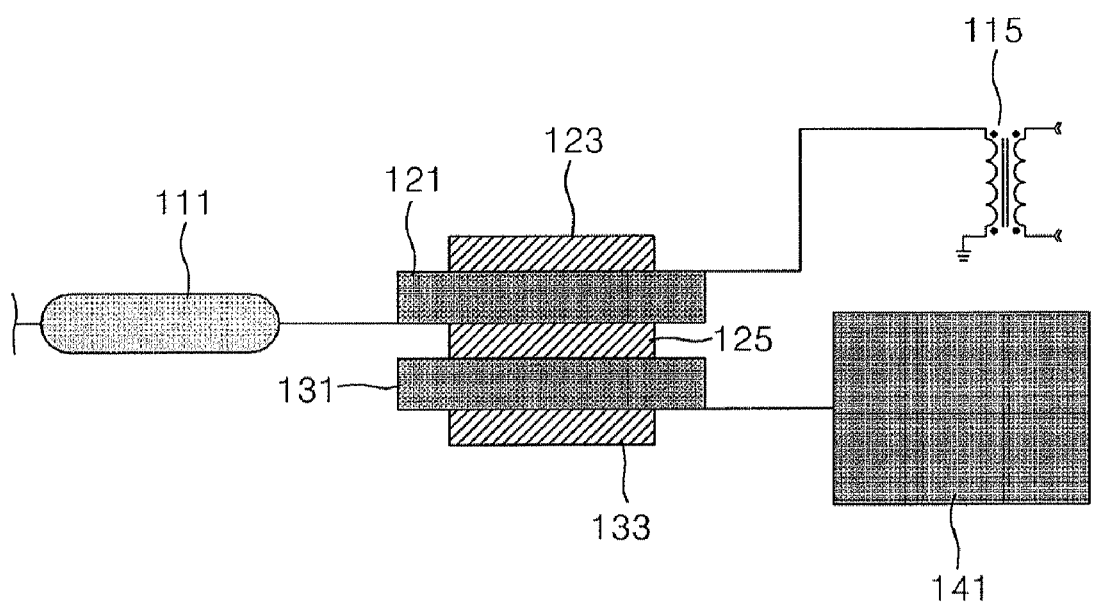
FIG. 5 is a circuit diagram of a backlight unit according to an exemplary embodiment of the present invention.

FIG. 5 is a circuit diagram of a backlight unit according to an exemplary embodiment of the present invention. As shown in FIG. 4, the sensing pattern capacitor and the feedback circuit unit 141 are electrically connected to the balancing pattern capacitor in FIG. 4. The feedback circuit unit 141 may control the abnormal driving state of the lamp 111.

The second pattern capacitor includes the second conductive pattern layer 125, a second PCB substrate 131, and a third conductive pattern layer 133. The second and third conductive pattern layers 125 and 133 surround the second PCB substrate 131 and are electrically connected to the second PCB substrate 131. The feedback circuit unit 141 is electrically connected to the third conductive pattern layer 133. A direct type backlight unit includes a plurality of the lamps. A circuit may be electrically connected to each of the lamps, wherein the circuit includes the balancing pattern capacitor, the sensing pattern capacitor, the transformer, and the feedback circuit unit.

In FIG. 5, one electrode terminal of the lamp 111 is electrically connected to one circuit, but in other exemplary embodiments, both electrode terminals of the lamp 111 may be electrically connected to separate circuits. Also, in other exemplary embodiments, the one electrode terminal of the lamp 111 is electrically connected to the circuit and the remaining electrode of the lamp 111 may be grounded.

Figure 6:
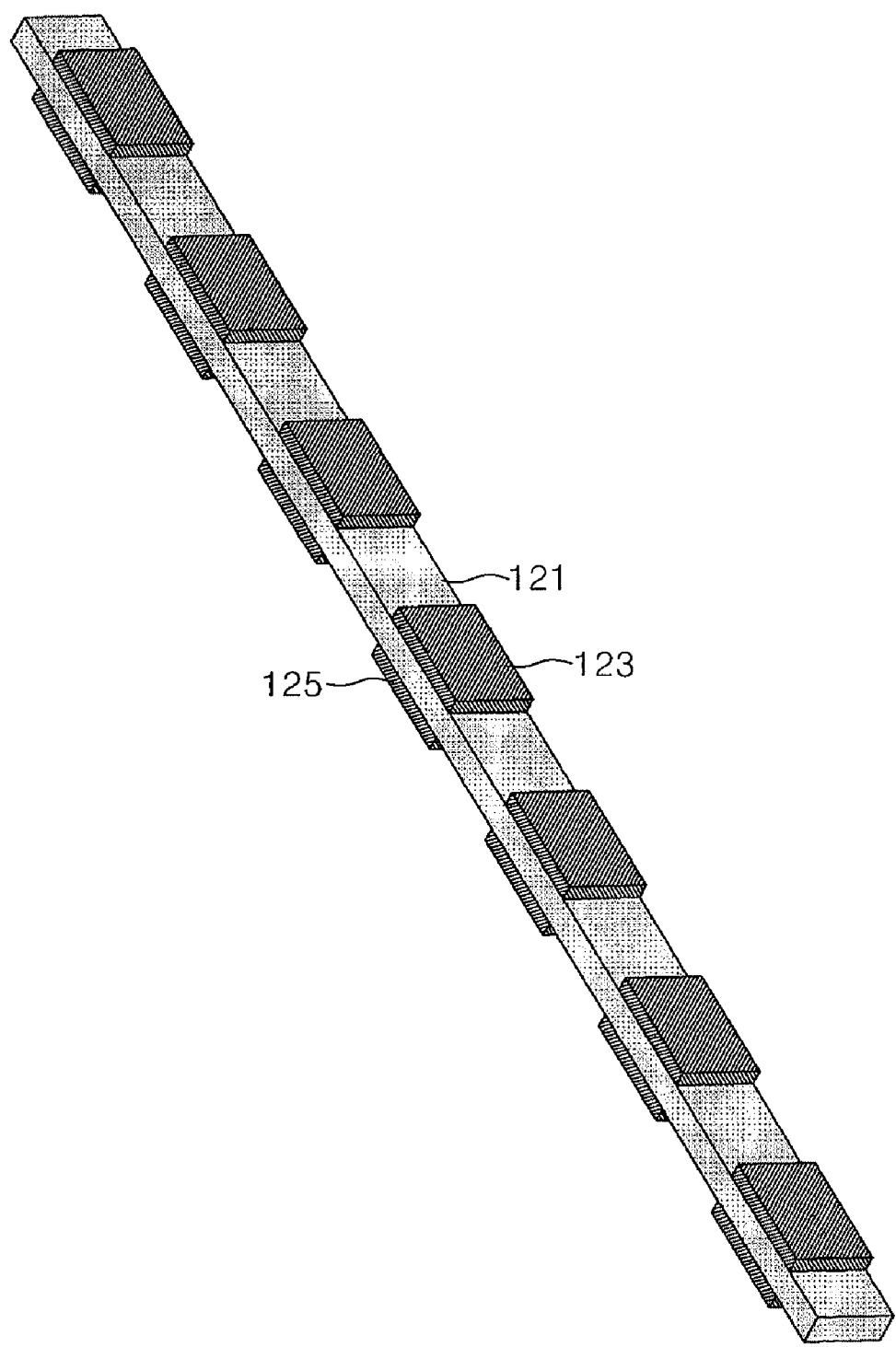
FIG. 6 is a perspective view of the balancing pattern capacitor and the sensing pattern capacitor according to an exemplary embodiment of the present invention.

FIG. 6 is a perspective view of the balancing pattern capacitor and the sensing pattern capacitor according to an exemplary embodiment of the present invention.

Referring to FIGS. 5 and 6, the balancing pattern capacitor and the sensing pattern capacitor may be formed by forming multiple conductive pattern layers on the first PCB substrate 121 including multiple first conductive patterns 123 and multiple second conductive patterns 125. The second PCB substrate 131 may be in contact with the multiple second conductive patters 125 on one side and may have a similar configuration of third conductive patterns 133 on the opposite side. The second PCB substrate 131 may be have a single surface or double surfaces.

As described above, the balancing pattern capacitor and the sensing pattern capacitor may reduce the manufacturing cost of the LCD display device. In addition, a protection circuit, which stops driving the lamps in the abnormal driving state, may be implemented by using the balancing pattern capacitor and the sensing pattern capacitor.

It will be apparent to those skilled in the art that various modifications and variations can be made to the exemplary embodiments of the present invention without departing from the spirit or scope of the invention.

What is claimed is:

1. A backlight unit of a liquid crystal display, comprising:
   a lamp;
   a balancing capacitor electrically connected to the lamp balancing current to the lamp;
   a transformer providing power to the lamp, the transformer electrically connected to the lamp via the balancing capacitor;
   a sensing capacitor electrically connected to a terminal of the balancing capacitor to detect a voltage across the balancing capacitor; and
   a feedback circuit electrically connected to the sensing capacitor to detect an abnormal driving state of the lamp.

2. The backlight unit of claim 1, wherein the lamp comprises a cold cathode fluorescence lamp.

3. The backlight unit of claim 1, wherein a first electrode terminal of the lamp is connected to a circuit including the balancing capacitor, the transformer, the sensing capacitor, and the feedback circuit unit, and a second electrode terminal of the lamp is electrically grounded.

4. The backlight unit of claim 1, wherein both the first and second electrode terminals of the lamp are electrically connected to a circuit including the balancing capacitor, the transformer, the sensing capacitor, and the feedback circuit.

5. The backlight unit of claim 1, wherein the feedback circuit detects the abnormal driving state of the lamp using a voltage applied from the balancing capacitor to the sensing capacitor.

6. The backlight unit of claim 1, wherein a first terminal of the balancing capacitor is connected to the lamp and not the transformer and a second terminal of the balancing capacitor is connected to the transformer and not the lamp.

7. A backlight unit of a liquid crystal display, comprising:
   a lamp;
   a balancing capacitor electrically connected to the lamp balancing current to the lamp;
   a transformer providing power to the lamp, the transformer electrically connected to the lamp via the balancing capacitor;
   a sensing capacitor electrically connected to a terminal of the balancing capacitor to detect a voltage across the balancing capacitor; and
   a feedback circuit electrically connected to the sensing capacitor to detect an abnormal driving state of the lamp,
   wherein the balancing capacitor comprises:
   a first printed circuit board ("PCB") substrate;
   a first conductive layer electrically connected to a first face of the first PCB substrate and to the transformer; and
   a second conductive layer electrically connected to a second face of the first PCB substrate and the lamp, the second face opposing to the first face of the first PCB substrate.

8. The backlight unit of claim 7, wherein the sensing capacitor comprises:
   the second conductive layer;
   a second PCB substrate electrically connected to the second conductive layer at a first face of the second PCB substrate; and a third conductive layer formed on a second face of the second PCB substrate opposing to the first face of the second PCB substrate, and electrically connected to the second PCB substrate.

9. The backlight unit of claim 8, wherein the second PCB substrate is electrically connected to the feedback circuit.

10. The backlight unit of claim 8, wherein the first, second, and third conductive layers each comprise a metal foil.

11. A liquid crystal display device, comprising:
   a liquid crystal display panel displaying images; and
   a backlight unit to supply light to the liquid crystal display panel,
   wherein the backlight unit comprises:
      a lamp;
      a balancing capacitor electrically connected to the lamp for balancing current to the lamp;
      a transformer providing power to the lamp, the transformer electrically connected to the lamp via the balancing capacitor;
      a sensing capacitor electrically connected to a terminal of the balancing capacitor to detect a voltage across the balancing capacitor; and
      a feedback circuit electrically connected to the sensing capacitor to detect an abnormal driving state of the lamp.

12. The liquid crystal display device of claim 11, wherein the lamp comprises a cold cathode fluorescence lamp.

13. The liquid crystal display device of claim 11, wherein a first electrode terminal of the lamp is connected to a circuit including the balancing capacitor, the transformer, the sensing capacitor, and the feedback circuit unit, and wherein a second electrode terminal of the lamp is electrically grounded.

14. The liquid crystal display device of claim 11, wherein both the first and second electrode terminals of the lamp are electrically connected to the circuit including the balancing capacitor, the transformer, the sensing capacitor, and the feedback circuit.

15. The liquid crystal display device of claim 11, wherein the feedback circuit detects the abnormal driving state of the lamp using voltages applied from the balancing capacitor to sensing capacitor.

16. The liquid crystal display device of claim 11, wherein a first terminal of the balancing capacitor is connected to the lamp and not the transformer and a second terminal of the balancing capacitor is connected to the transformer and not the lamp.

17. A liquid crystal display device, comprising:
   a liquid crystal display panel displaying images; and
   a backlight unit to supply light to the liquid crystal display panel,
   wherein the backlight unit comprises:
      a lamp;
      a balancing capacitor electrically connected to the lamp for balancing current to the lamp;
      a transformer providing power to the lamp, the transformer electrically connected to the lamp via the balancing capacitor;
      a sensing capacitor electrically connected to a terminal of the balancing capacitor to detect a voltage across the balancing capacitor; and
      a feedback circuit electrically connected to the sensing capacitor to detect an abnormal driving state of the lamp,
   wherein the balancing capacitor comprises:
   a first PCB substrate; and
   a first conductive layer electrically connected to a first face of the first PCB substrate and to the transformer; and
   a second conductive layer electrically connected to a second face of the first PCB substrate and the lamp, the second face opposing to the first face of the first PCB substrate.

18. The liquid crystal display device of claim 17, wherein the sensing capacitor comprises:
   the second conductive layer;
   a second PCB substrate electrically connected to the second conductive layer at a first face of the second PCB substrate; and
   a third conductive layer formed on a second face of the second PCB substrate opposing to the first face of the second PCB substrate, and electrically connected to the second PCB substrate.

19. The liquid crystal display device of claim 18, wherein the second PCB substrate is electrically connected to the feedback circuit.

20. The liquid crystal display device of claim 18, wherein the first, second, third conductive layers each comprise a metal foil.

* * * * *